US007039646B2

(12) United States Patent
Lee et al.

(10) Patent No.: US 7,039,646 B2
(45) Date of Patent: May 2, 2006

(54) METHOD AND SYSTEM FOR COMPRESSING VARYING-LENGTH COLUMNS DURING INDEX HIGH KEY GENERATION

(75) Inventors: Christina Marie Lee, San Jose, CA (US); Robert William Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 10/323,009

(22) Filed: Dec. 18, 2002

(65) Prior Publication Data

US 2004/0122837 A1 Jun. 24, 2004

(51) Int. Cl.
G06F 7/00 (2006.01)
(52) U.S. Cl. .................... 707/101; 707/100; 707/104.1
(58) Field of Classification Search .......... 707/1–104.1
See application file for complete search history.

(56) References Cited

U.S. PATENT DOCUMENTS

| 5,111,465 | A | * | 5/1992 | Edem et al. ................. 714/808 |
| 5,142,687 | A | * | 8/1992 | Lary ............................. 707/7 |
| 5,313,598 | A | * | 5/1994 | Yamakawa ..................... 707/1 |
| 5,319,779 | A | * | 6/1994 | Chang et al. .................. 707/3 |
| 5,592,667 | A | | 1/1997 | Bugajski ..................... 395/613 |
| 5,752,243 | A | * | 5/1998 | Reiter et al. .................... 707/3 |
| 5,845,274 | A | | 12/1998 | Chadha et al. ................. 707/2 |
| 5,930,805 | A | * | 7/1999 | Marquis ..................... 707/201 |
| 5,968,152 | A | | 10/1999 | Staats .......................... 710/104 |
| 6,055,526 | A | | 4/2000 | Ambroziak .................... 707/2 |
| 6,105,018 | A | | 8/2000 | Demers et al. ................. 707/2 |
| 6,279,003 | B1 | | 8/2001 | Lee et al. ..................... 707/100 |
| 6,279,004 | B1 | | 8/2001 | Lee et al. ..................... 707/100 |
| 6,421,664 | B1 | | 7/2002 | Groeschel et al. ............. 707/3 |
| 6,427,147 | B1 | * | 7/2002 | Marquis ........................ 707/4 |
| 6,859,455 | B1 | * | 2/2005 | Yazdani et al. ............. 370/392 |
| 2001/0042240 | A1 | | 11/2001 | Ng et al. ........................ 717/3 |
| 2002/0078047 | A1 | | 6/2002 | Hollines, III et al. ........... 707/8 |
| 2002/0087976 | A1 | * | 7/2002 | Kaplan et al. ................. 725/34 |
| 2002/0095412 | A1 | | 7/2002 | Lee et al. ....................... 707/7 |

(Continued)

OTHER PUBLICATIONS

Frank rubin, "Experiments in text File Compression", the ACM, vol. 19, Nov. 1976, pp. 617-623.*

(Continued)

*Primary Examiner*—Luke S Wassum
*Assistant Examiner*—Linh Black
(74) *Attorney, Agent, or Firm*—Sandra M. Parker, Esq.

(57) ABSTRACT

A computer-based method for compressing varying-length columns of a non-leaf page high key generated during splitting of an index tree leaf page from a key pair including a last key of a splitting leaf page and a first key of a corresponding new leaf page. The method performs a logical comparison of the key pair by comparing each key pair corresponding columns' data with padding considered as insignificant. In a logically equal key pair with equal-length columns, the high key field will have the entire column data, and for unequal-length columns it will have column data of the shorter column length +1 byte and will have all remaining varying-length columns without trailing padding data. In a logically unequal key pair, the high key will have all columns up to and including a first differing byte, wherein the stored varying-length columns are stored without trailing padding data.

18 Claims, 7 Drawing Sheets

U.S. PATENT DOCUMENTS

2002/0120598 A1    8/2002  Shadmon et al. ............... 707/1
2002/0169784 A1*  11/2002  Cha et al. ................... 707/102
2003/0093613 A1*   5/2003  Sherman ..................... 711/104

OTHER PUBLICATIONS

R.E.Wagner, "Indexing Design Considerations". Indexing, No. 4, 1973, pp. 351-367.*

Rudolf Bayer and Karl Unterauer, "Prefix B-trees", ACM Transactions on Database Systems, vol. No. 1, Mar. 1977, pp. 11-26.*

Douglas Comer, "The Ubiquitous B-Tree", ACM, Computing Surveys, vol. 11, No. 2, Jun. 1997, p. 121-137.*

Malkemus, T.R.: "Index Locking and Splitting", 1982, TDB 12-82 p. 3725-3729.

* cited by examiner

Last Key on Split Page

| A _ _ _ | C _ _ _ | F _ _ HJK |
|---|---|---|
| 4 | 4 | 6 |

First Key on New Page

| A _ _ _ | C _ _ | M _ _ K |
|---|---|---|
| 4 | 3 | 4 |

FIG. 3

New High Key Without Invention

| A _ _ _ | C _ _ | M |
|---|---|---|
| 4 | 3 | 1 |

New High Key With Invention

| A | C | M |
|---|---|---|
| 1 | 1 | 1 |

FIG. 4

Last Key on Split Page

| A _ _ | C _ _ | F _ _ |
|---|---|---|
| 3 | 3 | 3 |

First Key on New Page

| A _ _ | C _ _ _ _ | F _ _ _ _ _ |
|---|---|---|
| 3 | 5 | 6 |

FIG. 5

New High Key Without Invention

| A _ _ | C _ _ _ _ | F _ _ _ _ _ |
|---|---|---|
| 3 | 5 | 6 |

New High Key With Invention

| A _ _ | C _ _ _ | F |
|---|---|---|
| 3 | 4 | 1 |

FIG. 6

```
Compare two keys with padding considered insignificant
If keys compare logically equal Then Do
|  Strip_Blanks = No
|  For i = 1 to Max number of columns
|  |  If Strip_Blanks = No Then Do
|  |  |  Compare lengths for column(i)
|  |  |  If lengths are equal then
|  |  |    Store column data for entire length
|  |  |  Else Do
|  |  |  |  Store column data for smaller length + 1
|  |  |  |  Strip_Blanks = Yes
|  |  |  End
|  |  End
|  |  Else Do
|  |     Store only significant column data by stripping off trailing blanks from
|  |     varying-length columns
|  |  End
|  End
Else Do - Not equal
|  For i = 1 to Max number of columns
|  |  If varying-length column Then
|  |     Strip off trailing blanks
|  |  If differing byte in column(i) Then Do
|  |  |  Store significant data for column(i) up to and including differing byte
|  |  |  Leave For Loop
|  |  End
|  |  Else
|  |     Store significant column(i) data in its entirety
|  End
End
```

METHOD AND SYSTEM FOR COMPRESSING VARYING-LENGTH COLUMNS DURING INDEX HIGH KEY GENERATION

BACKGROUND OF THE INVENTION

1. Field of the Invention

This invention relates in general to database management systems performed by computers, and in particular to a method and system for compressing varying-length columns during index high key generation.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

A typical database management system includes both database files and index files. The database files store data in the rows and columns of tables stored on data pages. In such a table, the rows may correspond to individual records while the columns of the table represent attributes of the records. For example, in a customer information table of a database management system, each row might represent a different customer while each column represents different attributes of the customers, such as the name of each customer, the amount owed by each customer and the cash receipts received from each customer.

Instead of providing for direct sorting and searching of the records in the tables, the database management system relies on the index files which contain information or pointers about the location of the records in the tables stored in the database files. The index file can be searched and sorted (scanned) much more rapidly than can the database files. An index file is scanned through transactions in which criteria are stipulated for selecting records from a table. These criteria include keys which are the attributes by which the database finds the desired record or records using the index. The actions of a transaction that cause changes to recoverable data objects are recorded in a log.

In database management systems all data are stored in tables on a set of data pages that are separate from the index file. A table can have one or more indexes defined on it, each of which is an ordering of keys of the row of the tables and is used to access certain rows when the keys are known. An index is often implemented with a tree structure consisting of leaf pages and non-leaf pages. A page is a physical unit of transfer between main storage and secondary storage. A non-leaf page contains a list of page numbers of other index pages, along with the high key values for those pages. A leaf page is the lowest level of the index tree. It consists of keys and their associated row addresses which are pointers to the rows in the table that have the given key value.

Figure 1:
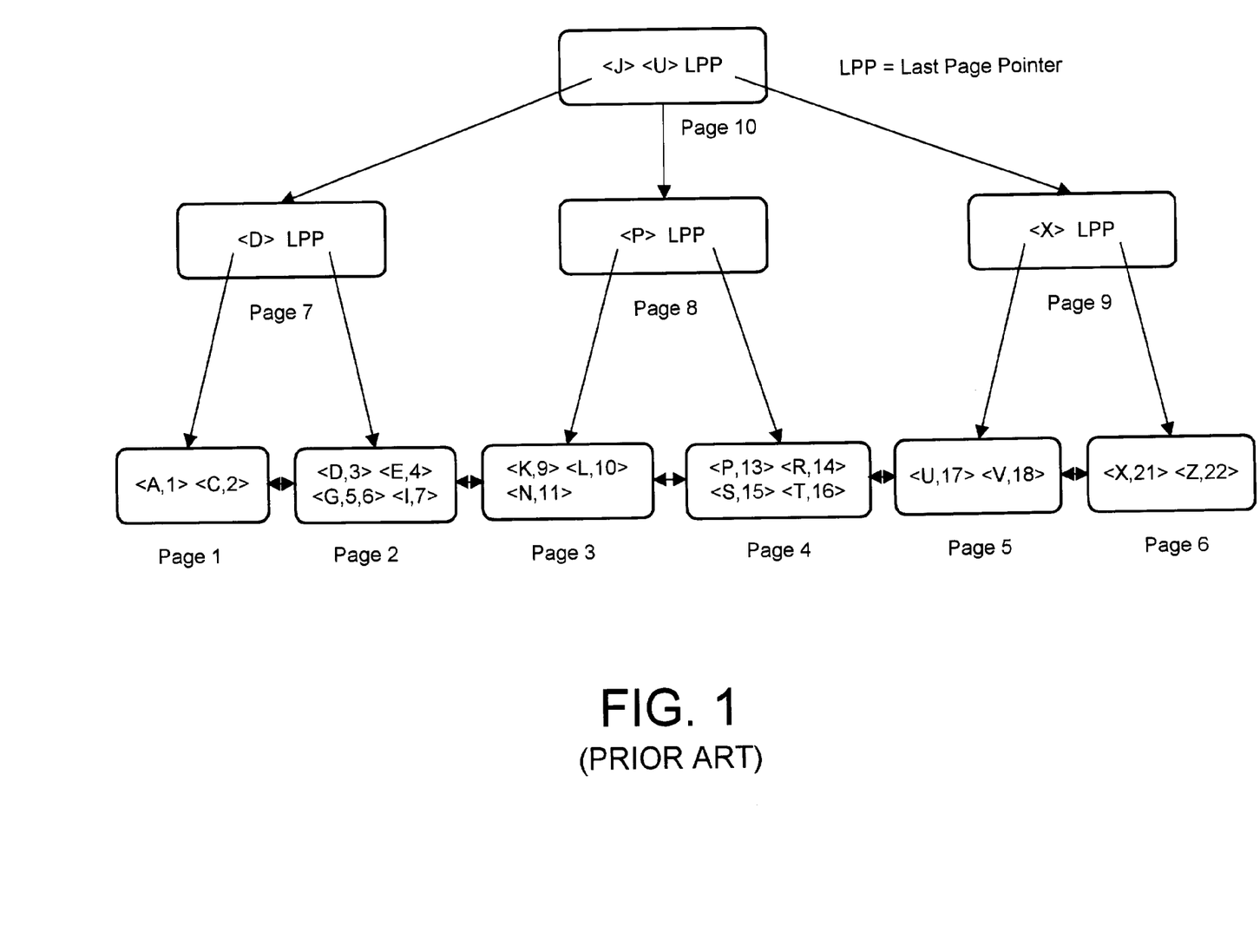
FIG. 1 illustrates a non-unique B-tree index file, according to the prior art.

Generally, all of the indexes for a table are stored in an index file which contains records of only the key values and record identifiers (RIDs) of database table records containing these key values. An RID consists of a data page ID concatenated with a sequence number unique within that range. One common type of index files is a B-tree having N levels of nodes or pages. The starting node at the top of the tree is called the root node and defines the interval of key values that the B-tree index covers. In the successive lower levels of nodes, before the lowest level of nodes, this key value interval is broken up into key value sub-intervals. The leaf nodes or pages in the lowest level of the tree contain the individual key values within the interval, together with the associated record (row) identifications (RIDs) that enable the records having those key values as attributes to be located in the tables of the database files. The leaf pages of an index contain entries (keys) each of which is conceptually a {key-value, RID} pair where the RID is treated as if it were an extra key field. A non-unique index is one that may contain more than one key with the same key value. In contrast, a unique index cannot contain more than one key with the same key value. Keys are maintained in an ascending collating order on all key fields. Leaf pages alone contain next-page and previous-page pointers so that ascending and descending range scans can be supported. Non-leaf pages contain child page pointers. FIG. 1 illustrates a non-unique B-tree index.

In current database technology, when an index leaf page splits because it is too full, a new high key value is inserted into the non-leaf page. If the new high key is copied from the first key on the new page, the entire key is usually copied although some of the data maybe unnecessary. For non-leaf searches, just the significant portion of the high key needs to be stored to distinguish key values in consecutive children of the non-leaf pages. By comparing the last key value of the splitting leaf page with the first key value of the new leaf page, the differing byte between the two key values can be determined. Only data of the first key value up to and including the differing byte needs to be stored as the new high key value in the non-leaf page. The rest of the data is unnecessary for the non-leaf searches and can be truncated.

However, when the non-leaf key has varying-length columns that contain padding data, all the blanks up to the differing byte are stored in the key. Some of this padding data is unnecessary for the non-leaf key comparisons and can be removed. Even if the actual data processing time is very short, some operations may require a considerable amount of time as data must be stored and retrieved from larger storage space and must be input by the user requesting the transaction. Accordingly, it is important that the database management system permits the data processor to truncate the high key suffix data and store only the index key data necessary for the non-leaf comparison during searches.

Therefore, there is a need for a simple, optimized and generic method and system for compressing varying-length columns in non-leaf page index keys during high key generation. This compression method would require less key space in the non-leaf pages so more non-leaf entries can be stored in index trees. As a result, the non-leaf fanout will be increased by reducing the number of index levels, thus allowing faster index tree traversals in database management systems.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for compressing varying-length columns of a non-leaf page high key generated during splitting of an index tree leaf page from a key pair including a last key of a splitting leaf page and a first key of a corresponding new leaf page. The method performs a logical comparison of the key pair by comparing each key pair corresponding columns' data with padding considered as insignificant. In one aspect of the preferred embodiment of the present invention, in a logically equal key pair with equal-length columns, the high key field will have the entire column data, and for unequal-length columns it will have column data of the shorter column length +1 byte and will have all remaining varying-length columns without trailing padding data. In another aspect of the preferred embodiment of the present invention, in a logically unequal key pair, the high key will have all columns up to and including a first differing byte, wherein the stored varying-length columns are stored without trailing padding data.

Another preferred embodiment of the present invention is a system implementing the above-mentioned method embodiments of the present invention.

Yet another preferred embodiment of the present invention includes a computer usable medium tangibly embodying a program of instructions executable by the computer to perform method steps of the above-mentioned method embodiments of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, a method and a computer usable medium embodying a program of instructions executable by a computer to perform the method of the present invention for compressing varying-length columns during index high key generation.

Figure 2:
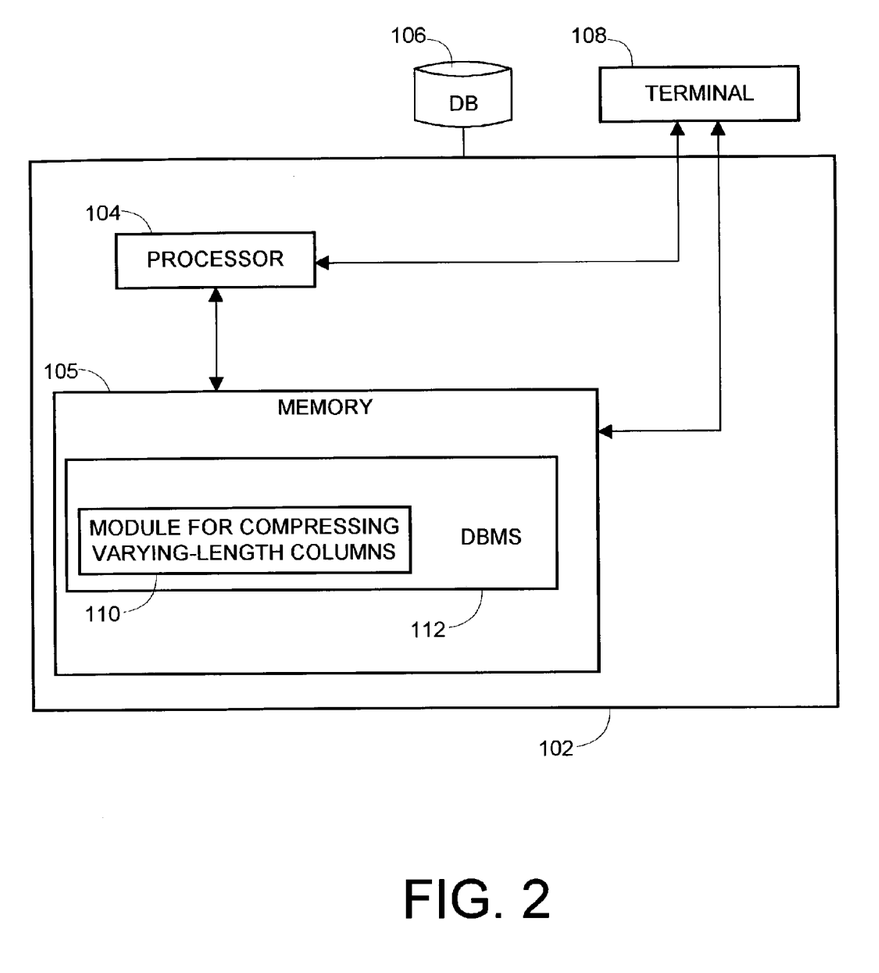
FIG. 2 illustrates a computer hardware and software environment enabling the method for compressing varying-length columns, according to the preferred embodiments of the present invention.

FIG. 2 illustrates an exemplary computer hardware and software environment usable by the preferred embodiments of the present invention, including a computer system 102 having one or more conventional processors 104 executing instructions stored in an associated computer memory 105, and having a computer system terminal 108. The operating memory 105 can be loaded with instructions received through an optional storage drive or through an interface with a computer network.

The processor 104 is connected to one or more electronic storage devices 106, such as disk drives, that store one or more relational databases. They may comprise, for example, optical disk drives, magnetic tapes and/or semiconductor memory. Each storage device permits receipt of a computer usable medium, such as a magnetic media diskette, magnetic tape, optical disk, semiconductor memory and other machine-readable storage device, and allows for method program steps recorded on the computer usable medium to be read and transferred into the computer memory. The recorded program instructions may include the code for the method embodiment of the present invention. Alternatively, the program steps can be received into the operating memory from a computer over the network.

Operators of the computer system terminal 108 use a standard operator terminal interface (not shown), such as IMS/DB/DC, CICS, TSO, OS/2 or other similar interface, to transmit electrical signals to and from the computer system 102, that represent commands for performing various tasks, such as search and retrieval functions, termed queries, against the databases stored on the electronic storage device 106. Data storage and retrieval is accomplished with queries against a database stored on an electronic storage device. In the present invention, these queries conform to the Structured Query Language (SQL) standard, and invoke functions performed by a DataBase Management System (DBMS) 112, such as a Relational DataBase Management System (RDBMS) software. In the preferred embodiments of the present invention, the RDBMS software is the DB2 product, offered by IBM for the z/OS, AS400, OS390, or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries and to non-relational databases. The method and system of the present invention may be used in a distributed computing environment in which two or more computer systems are connected by a network, such as World Wide Web, including environments in which the networked computers are of different type.

FIG. 2 further illustrates a software environment enabling preferred embodiments of the present invention. In the system shown in FIG. 2 the computer system 102 further includes a software module for compressing varying-length columns during index high key generation 110.

In the method and system of the present invention, when an index leaf page splits, a compressed high key is generated and inserted into the non-leaf page. The preferred embodiments of the present invention determine which significant portion of the high key needs to be stored in order to distinguish key values in consecutive children of the non-leaf index in non-leaf comparison and searches. By comparing the last key value of the splitting leaf page with the first key value of the new leaf page the differing byte between the two key values is determined. Only data of the first key value up to and including the differing byte is stored as the high key value and the rest of the data is eliminated as unnecessary for the non-leaf searches.

When the non-leaf page key has varying-length columns that contain trailing padding data, all the blanks up to the differing byte are stored in the key of a conventional system.

Some of this padding data is unnecessary for the non-leaf key comparisons and can be removed. The preferred embodiments of the present invention include a method for determining which padding data is unnecessary in the varying-length columns of the composite high key of the index tree. The method then removes the padding data to compress the non-leaf page high keys and reduce the space requirement for index keys of the non-leaf pages so more non-leaf entries can be stored. As a result, the non-leaf fanout is increased, thus reducing the number of index levels and allowing faster index tree traversals.

For SQL Insert and Delete commands blanks are considered to be significant data (i.e., "A"<than "A_") so a key "A" would be stored as a separate entry from "A_" in the table where "_" denotes a blank. However, for SQL Select command blanks are considered insignificant data (i.e., "A"="A_") so selecting the key "A" would return "A", "A_", "A_ _", etc. Traditionally, composite index keys with varying-length columns are compared one column at a time. Because the varying-length column may be of a different length for the two keys, the key with the shorter varying-length column must be logically treated as if padded with blanks to compare against the key with the longer varying-length column. Therefore, it is advantageous to store the smallest possible number of bytes in composite index keys with varying-length columns to reduce the number of processor operations and increase the speed.

Because trailing blanks do not affect the result of SQL Select command during index tree searches, the trailing blanks can be stripped off the varying-length columns of index high keys. The present invention strips the stored trailing blanks from varying-length columns in non-leaf index page high keys. The method embodiment of the present invention starts by comparing each pair of the composite index keys to determine whether the keys are logically equivalent, in which case the padding is considered insignificant (i.e. "A_"="A_ _"). The pair of the composite index keys includes the last key of the splitting leaf page and the first key of the new leaf page.

By comparing the last key value of the splitting leaf page with the first key value of the new leaf page, the differing byte between the two key values can be determined.. If the keys in the pair are logically equivalent, the method compares the lengths of each varying-length column of the pair to determine which is the significant data to be stored in the index key.

Unequal Comparison

If the significant data, not including trailing blanks, logically compares unequal between the two keys, only the significant data for each column up to and including the differing byte need to be stored in the high key. In that case, the trailing blanks for the preceding varying-length columns are all removed in the present invention.

Figure 3:
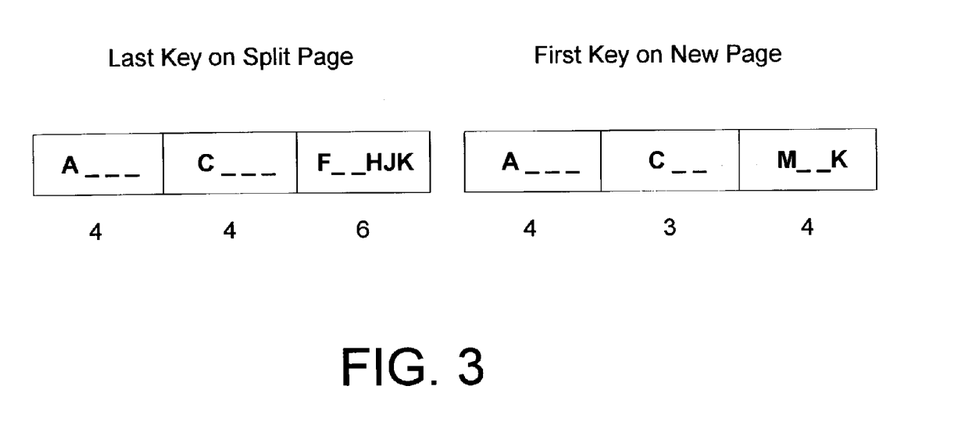
FIG. 3 illustrates an example of last and first keys, according to the prior art.
Figure 4:
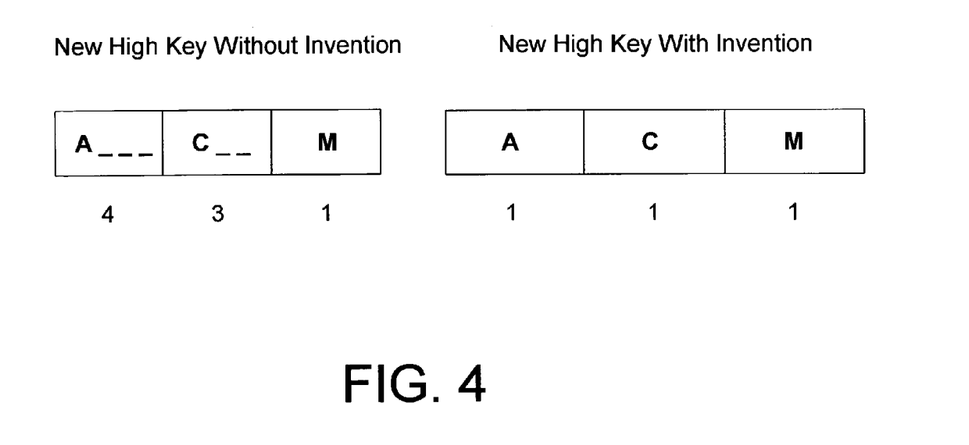
FIG. 4 illustrates the new high keys, according to the prior art and preferred embodiments of the present invention.

FIG. 3 illustrates an example of last and first keys, stored according to the conventional method of prior art. It presents an example where the keys contain three varying-length columns and the symbol "_" denotes a blank character. Since there are three varying-length columns, three logical comparisons are needed. The first two columns compare logically equal but the third column differs on the first byte. In conventional systems without the present invention the high key would contain the blanks in the first two columns so the total length would be 8 bytes. However, according to the preferred embodiments of the present invention, the blanks are stripped off so the total length is only three bytes, as shown in FIG. 4, which illustrates the new high keys according to the prior art and preferred embodiments of the present invention.

Equal Comparison

If the significant data (not including trailing blanks) compares equal between the two keys, then the blanks become significant and the column lengths are important. The trailing blanks for the preceding varying-length columns cannot all be removed or the non-leaf comparisons will be incorrect. However, some of the trailing blanks may be removed.

After the two keys have been determined to be logically equal, the column lengths are compared. If the lengths are equal, the column data are stored for the entire length. However, once the lengths compare unequal, the column data are stored for the shorter column length +1 byte. This is the differing byte where the two keys would compare unequal when the padding is considered significant. After this point, trailing blanks for all the following varying-length columns are unnecessary and can be removed but the significant data must still be stored.

Figure 5:
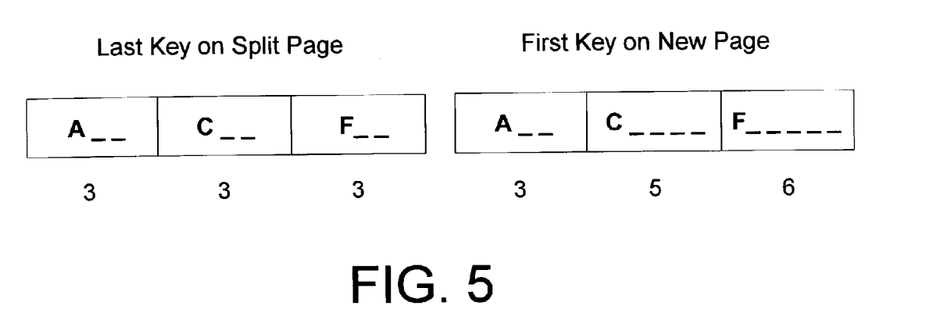
FIG. 5 illustrates another example of last and first keys, according to the prior art.
Figure 6:
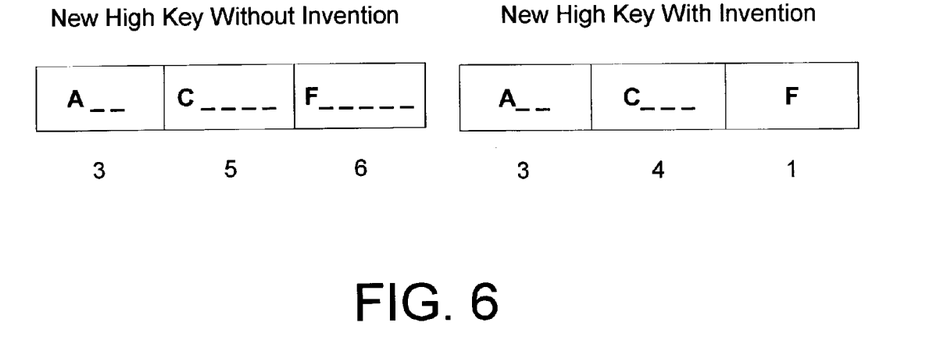
FIG. 6 illustrates the new high keys, according to the prior art and preferred embodiments of the present invention.

FIG. 5 presents another example of last and first keys, stored according to the prior art. In the example illustrated in FIG. 5, the keys are logically equal and only differ on the number of blank characters. In a conventional system without the present invention, since no differing byte is found during the comparison, the entire key would be used as the high key with a total length of 14 bytes. However, in the preferred embodiments of the present invention, the keys are first compared for logical equivalence and then the column lengths are compared. Since the second columns' lengths are different (3<5), only "C_ _ _" is stored, which is the shorter column length (3)+1 and equals 4 bytes. After the differing byte has been stored, all the blanks on the subsequent column can be removed so only the symbol "F" needs to be stored. Therefore, the high key in the present invention only requires a total length of 8 bytes, as illustrated in FIG. 6, which illustrates the new high keys according to the prior art and preferred embodiments of the present invention.

Figure 7:
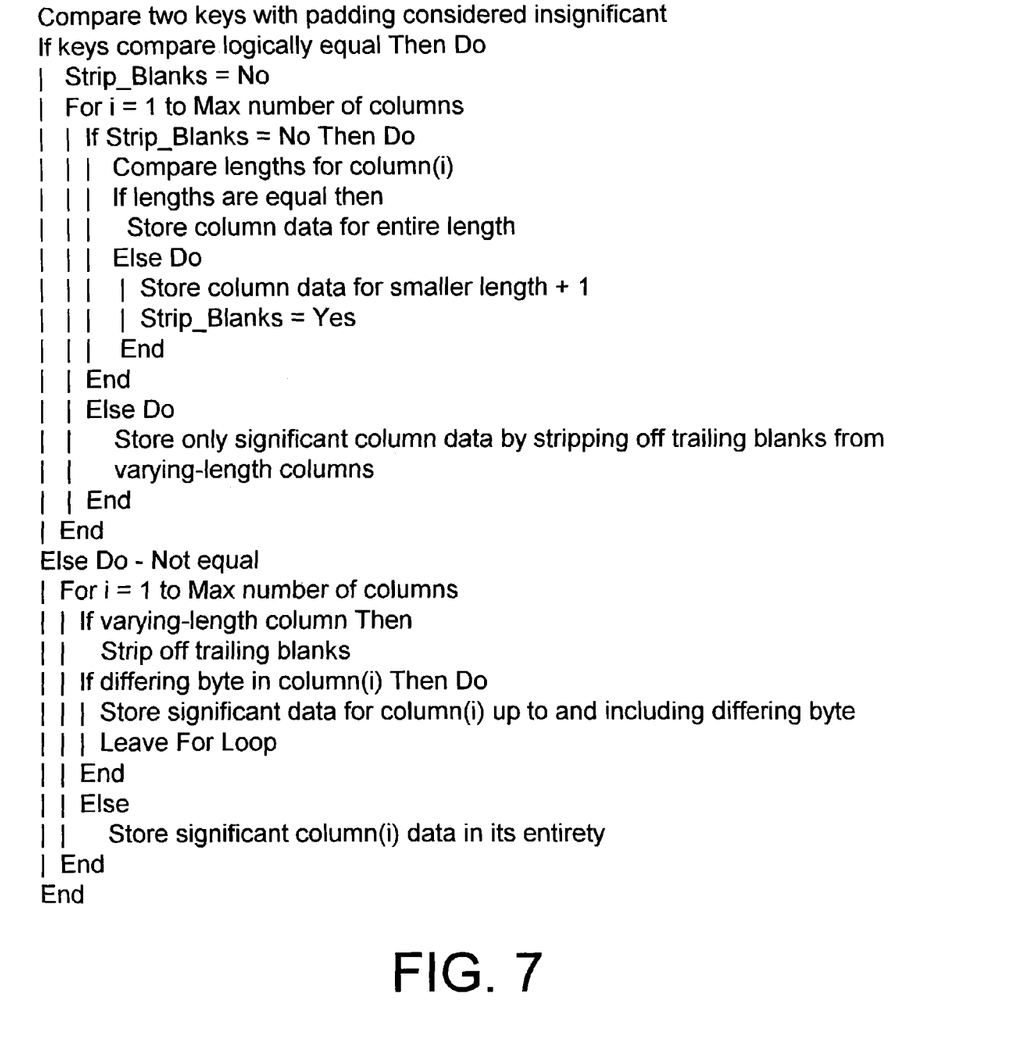
FIG. 7 illustrates a sample pseudocode used to generate the non-leaf high key, according to the preferred embodiments of the present invention.

FIG. 7 illustrates a sample pseudocode having steps used to generate the non-leaf high key, according to the preferred embodiments of the present invention. Although the preferred method is shown as stripping the trailing blanks, it is applicable to any type of trailing padding data. In the first step a logical comparison of the pair of keys with insignificant padding is performed. If the two keys of the pair compare logically equal then a flag Strip_Blanks is set to No to define equal comparison situation. Next, the first loop is performed for the maximum number of key columns to compare lengths for each two corresponding columns of the key pair and if the lengths are equal then the method stores column data for the entire column length. Otherwise, the method stores column data for the shorter column length +1 bytes and sets the flag Strip_Blanks to Yes. After the loop finds the flag Strip_Blanks=Yes, the method stores only significant column data by stripping off all trailing blanks from all remaining varying-length columns.

Figure 8A:
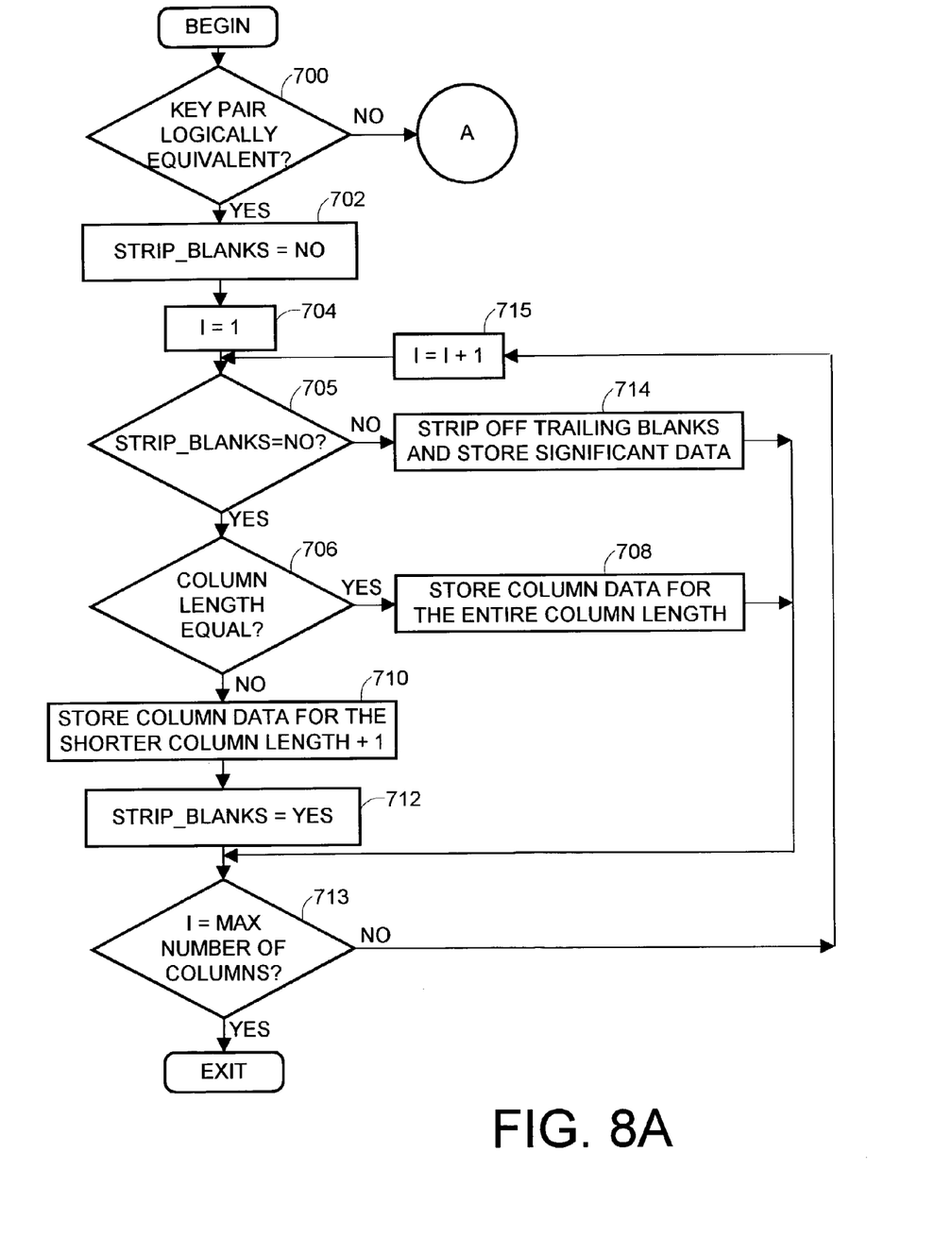
FIGS. 8A and 8B illustrate the flowcharts of the module for compressing varying-length columns, according to the preferred embodiments of the present invention.

If the keys do not compare logically equal, the unequal comparison situation is found and the second loop is performed for the maximum number of key columns. If it is a varying-length column, the method strips off trailing blanks from that column. When a differing byte is found in a column, the method stores significant data for that column up to and including the differing byte and leaves the loop. Otherwise, the method stores the significant column data in its entirety. FIGS. 8A and 8B illustrate the flowcharts of the module for compressing varying-length columns which has the steps used to generate the non-leaf high key, according to the preferred embodiments of the present invention. Although the preferred method is shown as stripping the trailing blanks, it is applicable to any type of trailing padding data. In step 700, a logical comparison of the pair of keys with insignificant padding is performed. If the two keys of the pair compare logically equal then a flag Strip_Blanks is set to No in step 702 to define equal comparison situation and loop counter I is set to 1 in step 704. Next, in step 705 the first loop starts and the step checks whether the flag Strip_Blanks is set to No. If so, step 706 compares lengths for each two corresponding columns of the key pair. If the lengths are equal, step 708 stores column data for the entire column length. Otherwise, step 710 stores column data for the shorter column length +1 bytes and sets the flag Strip_Blanks to Yes in step 712. If step 705 finds the flag Strip_Blanks=Yes, step 714 stores only significant column data by stripping off all trailing blanks from the varying-length column. Next, in step 713 it is checked whether the maximum number of key columns is tested and if so the program exits. If not, the loop counter is increased in step 715 and the loop continues.

Figure 8B:
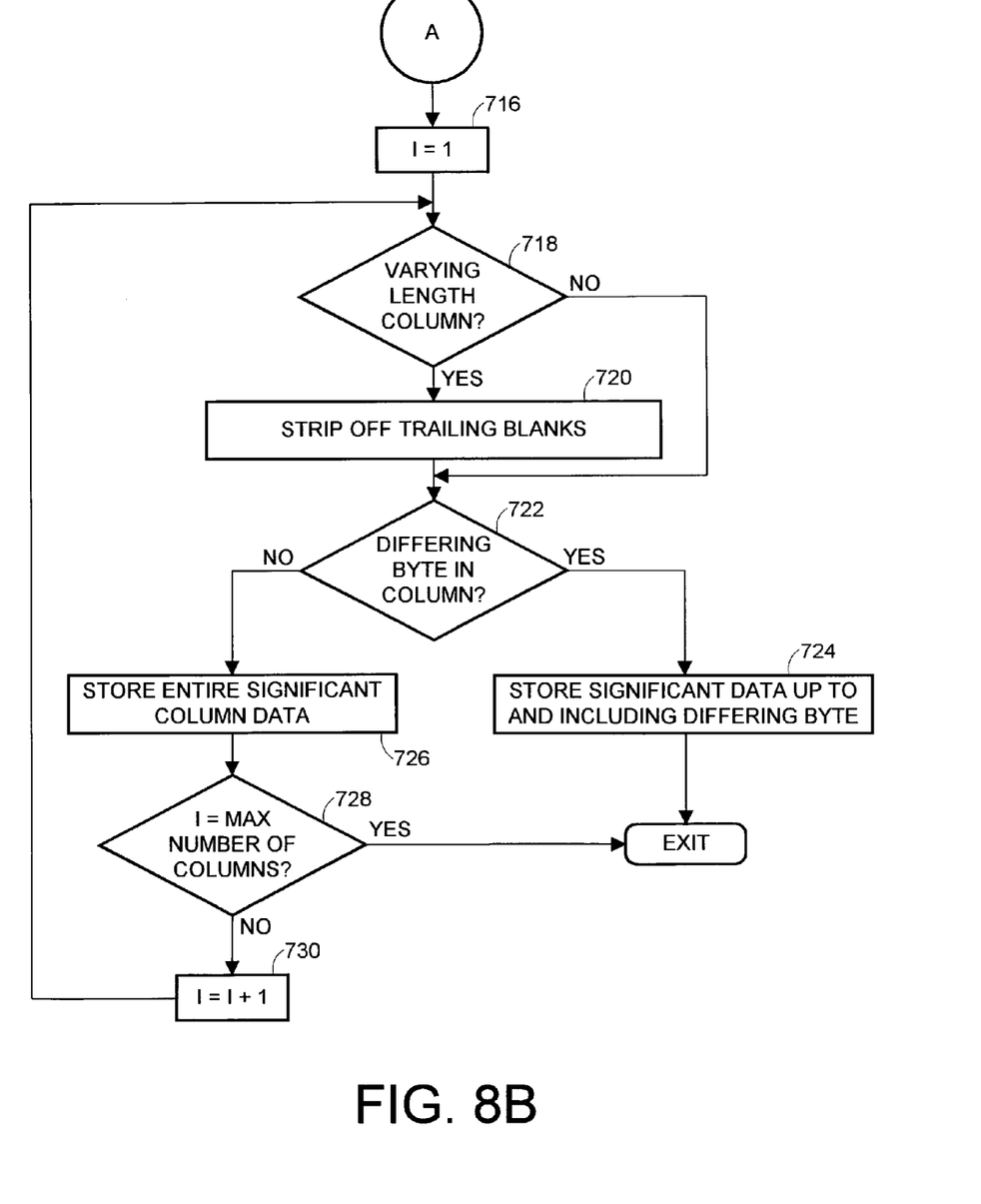

If the keys do not compare logically equal in step 700, the unequal comparison situation is found and the second loop of FIG. 8B is performed for the maximum number of key columns, tested in step 728. Step 716 sets up the loop counter I to 1. If step 718 determines that it is a varying-length column, step 720 strips off trailing blanks for that column. When step 722 finds a differing byte in a column, step 724 stores significant data for that column up to and including the differing byte and leaves the loop through the exit. Otherwise, step 726 stores the significant column data in its entirety. If step 728 determines that the loop counter I has not reached the maximum number of columns, the loop counter is increased in step 730 and the loop continues in step 718.

In the preferred embodiments of the present invention only significant data of the first key of the new leaf page up to and including the differing byte is stored as the high key of the non-leaf page and extraneous padding data that does not affect key comparisons is eliminated as unnecessary for the non-leaf searches, thus reducing the storage space and index construction time and improving the index tree search performance.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method, in a database management system, for removing unnecessary trailing padding from an index high key created from a key pair with varying-length columns, the method comprising the steps of:
   (a) performing a logical comparison of the key pair by comparing each key pair corresponding columns' data with trailing padding considered as insignificant; and
   (b) in a logically equal key pair:
      (i) comparing corresponding columns' lengths;
      (ii) for equal-length columns, storing in the high key entire column data; and
      (iii) for unequal-length columns, storing column data for shorter column length +1 bytes and storing remaining varying-length columns without trailing padding data.

2. The method according to claim 1, wherein the high key being a non-leaf page high key generated, during splitting of an index tree leaf page, from a key pair including a last key of a splitting leaf page and a first key of a corresponding new leaf page.

3. The method according to claim 2, wherein the trailing padding data being blanks.

4. A computer-based method, in a database management system, for removing unnecessary trailing padding from an index high key created from a key pair with varying-length columns, the method comprising the steps of:
   (a) performing a logical comparison of the key pair by comparing each key pair corresponding columns' data with trailing padding considered as insignificant; and
   (b) in a logically unequal key pair, storing in the high key all columns up to and including a first differing byte, wherein the stored varying-length columns being stored without trailing padding data.

5. The method according to claim 4, wherein the high key being a non-leaf page high key generated, during splitting of an index tree leaf page, from a key pair including a last key of a splitting leaf page and a first key of a corresponding new leaf page.

6. The method according to claim 5, wherein the trailing padding data being blanks.

7. A data processing system, in a database management system, for removing unnecessary trailing padding from an index high key created from a key pair with varying-length columns, the data processing system comprising means for performing the steps of:
   (a) performing a logical comparison of the key pair by comparing each key pair corresponding columns' data with trailing padding considered as insignificant; and
   (b) in a logically equal key pair:
      (i) comparing corresponding columns' lengths;
      (ii) for equal-length columns, storing in the high key entire column data; and
      (iii) for unequal-length columns, storing column data for shorter column length +1 bytes and storing remaining varying-length columns without trailing padding data.

8. The system according to claim 7, wherein the high key being a non-leaf page high key generated, during splitting of an index tree leaf page, from a key pair including a last key of a splitting leaf page and a first key of a corresponding new leaf page.

9. The system according to claim 8, wherein the trailing padding data being blanks.

10. A data processing system, in a database management system, for removing unnecessary trailing padding from an index high key created from a key pair with varying-length columns, the data processing system comprising means for performing the steps of:
    (a) performing a logical comparison of the key pair by comparing each key pair corresponding columns' data with trailing padding considered as insignificant; and
    (b) in a logically unequal key pair, storing in the high key all columns up to and including a first differing byte, wherein the stored varying-length columns being stored without trailing padding data.

11. The system according to claim 10, wherein the high key being a non-leaf page high key generated, during splitting of an index tree leaf page, from a key pair including a last key of a splitting leaf page and a first key of a corresponding new leaf page.

12. The system according to claim 11, wherein the trailing padding data being blanks.

13. A computer usable medium, in a database management system, tangibly embodying a program of instructions executable by the computer to perform a computer-based method for removing unnecessary trailing padding from an index high key created from a key pair with varying-length columns, comprising the steps of:
   (a) performing a logical comparison of the key pair by comparing each key pair corresponding columns' data with trailing padding considered as insignificant; and
   (b) in a logically equal key pair:
      (i) comparing corresponding columns' lengths;
      (ii) for equal-length columns, storing in the high key entire column data; and
      (iii) for unequal-length columns, storing column data for shorter column length +1 bytes and storing remaining varying-length columns without trailing padding data.

14. The method according to claim 13, wherein the high key being a non-leaf page high key generated, during splitting of an index tree leaf page, from a key pair including a last key of a splitting leaf page and a first key of a corresponding new leaf page.

15. The method according to claim 14, wherein the trailing padding data being blank.

16. A computer usable medium, in a database management system, tangibly embodying a program of instructions executable by the computer to perform a computer-based method for removing unnecessary trailing padding from an index high key created from a key pair with varying-length columns, comprising the steps of:
   (a) performing a logical comparison of the key pair by comparing each key pair corresponding columns' data with trailing padding considered as insignificant; and
   (b) in a logically unequal key pair, storing in the high key all columns up to and including a first differing byte, wherein the stored varying-length columns being stored without trailing padding data.

17. The method according to claim 16, wherein the high key being a non-leaf page high key generated, during splitting of an index tree leaf page, from a key pair including a last key of a splitting leaf page and a first key of a corresponding new leaf page.

18. The method according to claim 17, wherein the trailing padding data being blank.

* * * * *